(12) United States Patent
Dickie

(10) Patent No.: US 10,327,300 B2
(45) Date of Patent: Jun. 18, 2019

(54) LIGHT SOURCE TO DARKEN A PHOTOCHROMIC LENS

(71) Applicant: Paul Dickie, Elko New Market, MN (US)

(72) Inventor: Paul Dickie, Elko New Market, MN (US)

( * ) Notice: Subject to any disclaimer, the term of this patent is extended or adjusted under 35 U.S.C. 154(b) by 0 days.

(21) Appl. No.: 15/789,675

(22) Filed: Oct. 20, 2017

(65) Prior Publication Data

US 2019/0124741 A1    Apr. 25, 2019

(51) Int. Cl.
| | |
|---|---|
| *F21V 21/084* | (2006.01) |
| *H05B 33/08* | (2006.01) |
| *G02C 7/10* | (2006.01) |
| *H05B 37/02* | (2006.01) |

(52) U.S. Cl.
CPC ......... *H05B 33/0854* (2013.01); *G02C 7/102* (2013.01); *H05B 37/0218* (2013.01)

(58) Field of Classification Search
CPC ............ H05B 33/0815; H05B 33/0818; H05B 41/2828; H05B 41/3921; H05B 41/3927; H05B 37/029; H05B 33/0803; H05B 37/0254; H05B 37/02; A41D 27/085; A42B 1/242; G09F 21/02
See application file for complete search history.

(56) References Cited

U.S. PATENT DOCUMENTS

| | | |
|---|---|---|
| 4,933,813 A | 6/1990 | Berger |
| 5,387,798 A | 2/1995 | Funakoshi et al. |
| 5,498,931 A | 3/1996 | Bedocs |
| 5,623,149 A | 4/1997 | Kilmer |
| 6,246,505 B1 | 6/2001 | Teowee et al. |
| 7,204,592 B2 | 4/2007 | Wertheim et al. |
| 8,439,530 B2 | 5/2013 | Jungwirth et al. |
| 8,492,995 B2 | 7/2013 | Maxik et al. |
| 8,646,925 B2 | 2/2014 | Kubo et al. |
| 8,686,644 B2 | 4/2014 | Wootton |
| 8,687,258 B2 | 4/2014 | Lam et al. |
| 8,752,970 B2 | 6/2014 | Jungwirth |
| 2002/0024808 A1 | 2/2002 | Suehiro et al. |

(Continued)

FOREIGN PATENT DOCUMENTS

| | | |
|---|---|---|
| EP | 0562201 B1 | 4/1997 |
| WO | WO-2013/123592 A1 | 8/2013 |

*Primary Examiner* — Minh D A
(74) *Attorney, Agent, or Firm* — Craige Thompson; Thompson Patent Law

(57) ABSTRACT

Apparatus and associated methods relate to a Dynamic Ultraviolet Light System (DUVLS) that directs ultraviolet (UV) light at an intensity controlled by a user or in response to an ambient light level to maintain a photochromic target lens in a darkened state. In an illustrative example, the target lens may be located in a brightly lighted environment separated by a UV filter from a broadband light source, such as the sun. The dynamic ultraviolet light system may have its output intensity regulated by a user or by a controller responsive to a light sensor. The light sensor may be configured to detect the ambient light level to which the target lens is being exposed. Various embodiments may advantageously enhance a user's vision by maintaining the user's spectacles with photochromic lenses, in a darkened state while the user is in a brightly lighted environment with substantially attenuated natural UV light levels.

19 Claims, 10 Drawing Sheets

(56) References Cited

U.S. PATENT DOCUMENTS

| | | |
|---|---|---|
| 2002/0126278 A1 | 9/2002 | Olshausen |
| 2004/0167501 A1 | 8/2004 | Island et al. |
| 2005/0057701 A1* | 3/2005 | Weiss ................. G02B 27/0101 349/10 |
| 2005/0078473 A1* | 4/2005 | Zuloff ................... A42B 1/004 362/106 |
| 2005/0230596 A1 | 10/2005 | Howell et al. |
| 2006/0022176 A1 | 2/2006 | Wang et al. |
| 2006/0133073 A1* | 6/2006 | Nakata .................. H01L 25/167 362/192 |
| 2008/0103560 A1 | 5/2008 | Powell et al. |
| 2008/0223441 A1 | 9/2008 | Jungwirth |
| 2010/0073948 A1 | 3/2010 | Stein et al. |
| 2011/0125230 A1 | 5/2011 | Friedman et al. |
| 2011/0241549 A1 | 10/2011 | Wootton |
| 2011/0255303 A1 | 10/2011 | Nichol et al. |
| 2012/0075829 A1 | 3/2012 | Li et al. |
| 2012/0091923 A1 | 4/2012 | Kastner-Jung et al. |
| 2012/0101774 A1 | 4/2012 | Nishikawa |
| 2013/0006556 A1 | 1/2013 | Nishikawa |
| 2013/0294045 A1 | 11/2013 | Morgenbrod |
| 2013/0322114 A1 | 12/2013 | Nishitani et al. |
| 2014/0356229 A1 | 12/2014 | Farren |
| 2015/0313496 A1* | 11/2015 | Connor ................ A61B 5/0476 600/301 |

\* cited by examiner

LIGHT SOURCE TO DARKEN A PHOTOCHROMIC LENS

TECHNICAL FIELD

Various embodiments relate generally to ultraviolet lighting.

BACKGROUND

Sunlight is all around us. As such, marketers have provided the masses a seemingly endless variety of sun-protective eyewear embodying various frame styles and lens colors. This has provided eyeglass wearers with multiple ways to look great, reduce sun glare and reduce the risk of eye damage. The advent of photochromic lenses provided eyeglass wearers with the convenience of automatic lens darkening of their prescription lenses in sunlit environments.

SUMMARY

Apparatus and associated methods relate to a Dynamic Ultraviolet Light System (DUVLS) that directs ultraviolet (UV) light at an intensity controlled by a user or in response to an ambient light level to maintain a photochromic target lens in a darkened state. In an illustrative example, the target lens may be located in a brightly lighted environment separated by a UV filter from a broadband light source, such as the sun. The dynamic ultraviolet light system may have its output intensity regulated by a user or by a controller responsive to a light sensor. The light sensor may be configured to detect the ambient light level to which the target lens is being exposed. Various embodiments may advantageously enhance a user's vision by maintaining the user's spectacles with photochromic lenses, in a darkened state while the user is in a brightly lighted environment with substantially attenuated natural UV light levels.

In an illustrative example, photochromic lenses may be operable to darken in the presence of sunlight, specifically in response to the short wavelengths of ultraviolet (UV) light. By employment of the DUVLS, wearers of photochromic lenses may experience the benefits of the automatic darkening effect when in enclosed, windowed areas, for example, in an automobile, bus, train, airplane, helicopter, boat, or building, despite the attenuation of UV light from the various window glass. By employment of the DUVLS, wearers of photochromic lenses may also experience the benefits of the automatic darkening effect when wearing a helmet which includes a UV blocking faceplate.

Various embodiments may achieve one or more advantages. Users may more fully receive beneficial lens darkening even while the user's spectacles with photochromic lenses are being shaded from the sun. For example, some embodiments may attach to, or be integrated within, the visor of a user's headwear. Some embodiments may be embedded in a more permanent and convenient apparatus, such as an automobile's sun visor, for example. Various examples may be portably operated, for example using solar power or small batteries. Reliable lens darkening operation may also be achieved in implementations powered from a readily available power system, for example, by tapping into existing wiring of a lighted cosmetic mirror in a sun visor of an automobile. Various embodiments may be powered with an AC or DC power transformer, configured to receive AC mains power. Some embodiments may provide photochromic darkening for observers and passers-by, for example, who may be wearing photochromic lens while in an indoor area, such as a lobby, flooded with ambient sunlight through a UV-filtered window.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1A:
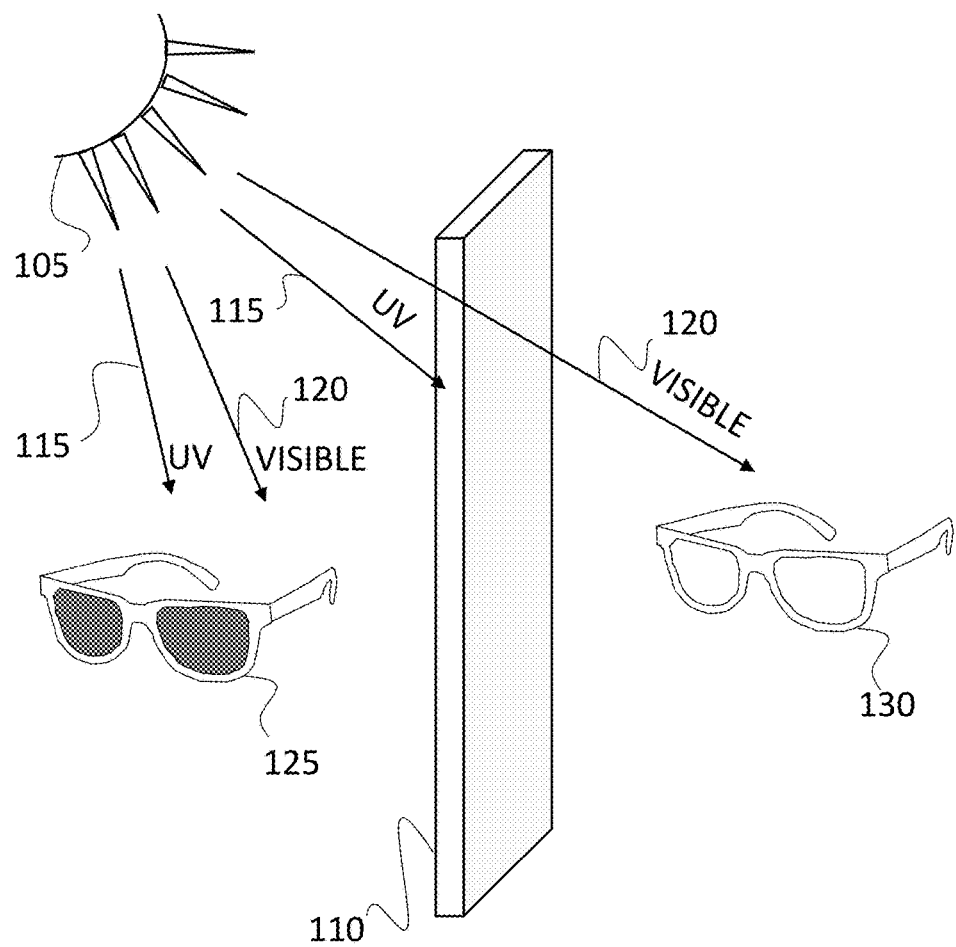
FIG. 1A depicts a prospective view of the basic functionality of spectacles with photochromic lenses.
Figure 2:
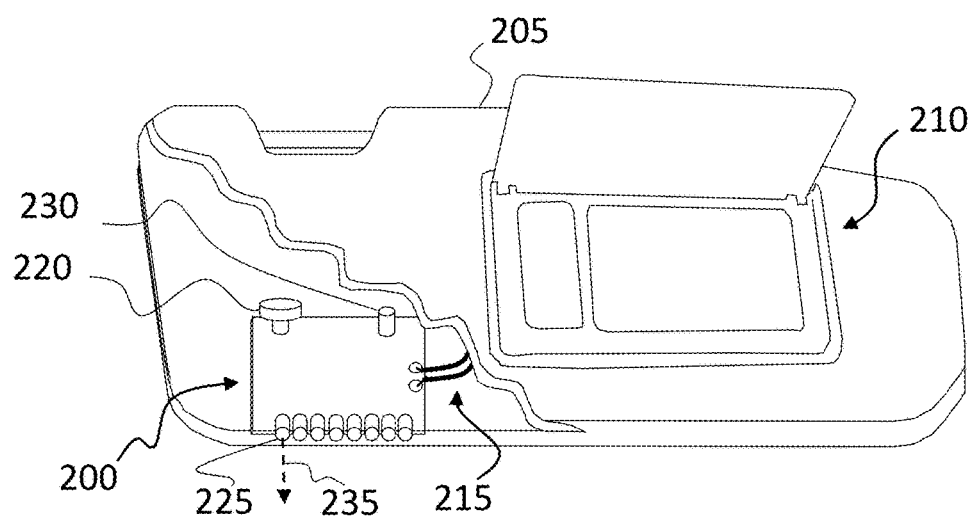
FIG. 2 depicts a prospective view of an exemplary DUVLS embodiment that illustrates integration within a sun visor.
Figure 3:
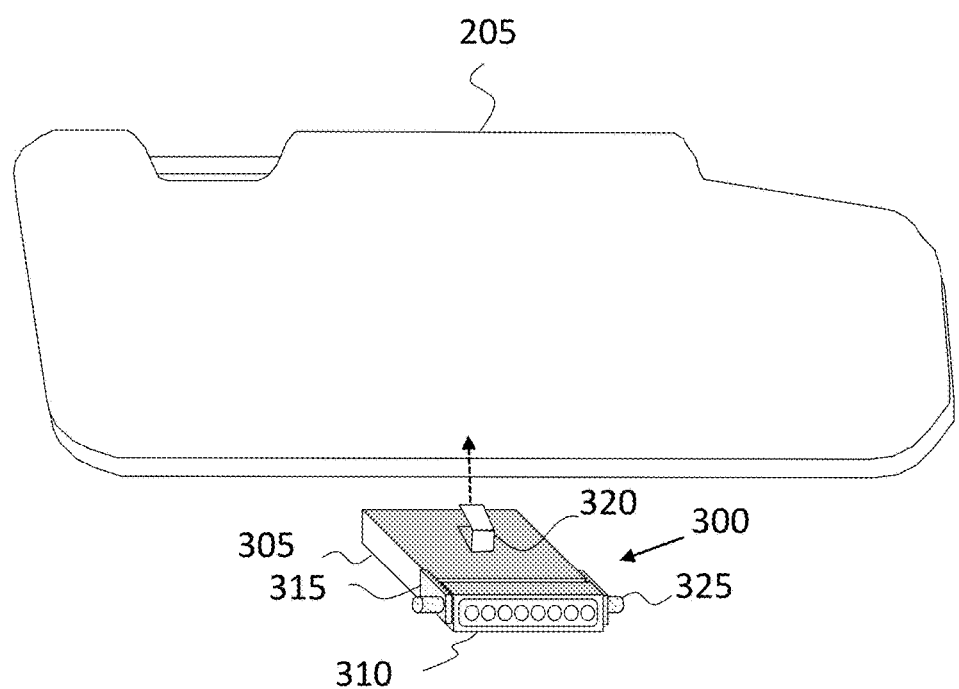
FIG. 3 depicts a prospective view of an exemplary DUVLS embodiment that illustrates attachment to a sun visor and an exemplary tilting light bar feature.
Figure 4:
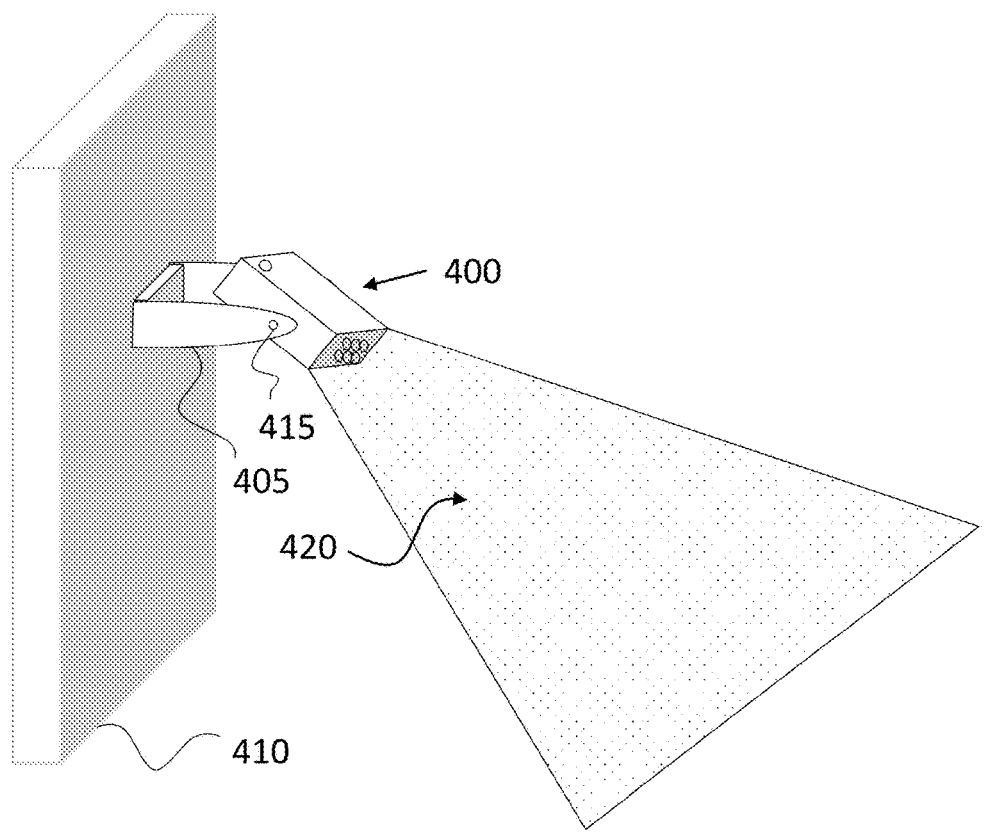
FIG. 4 depicts a prospective view of an exemplary DUVLS embodiment that illustrates attachment to a wall and an exemplary tilt feature.
Figure 5:
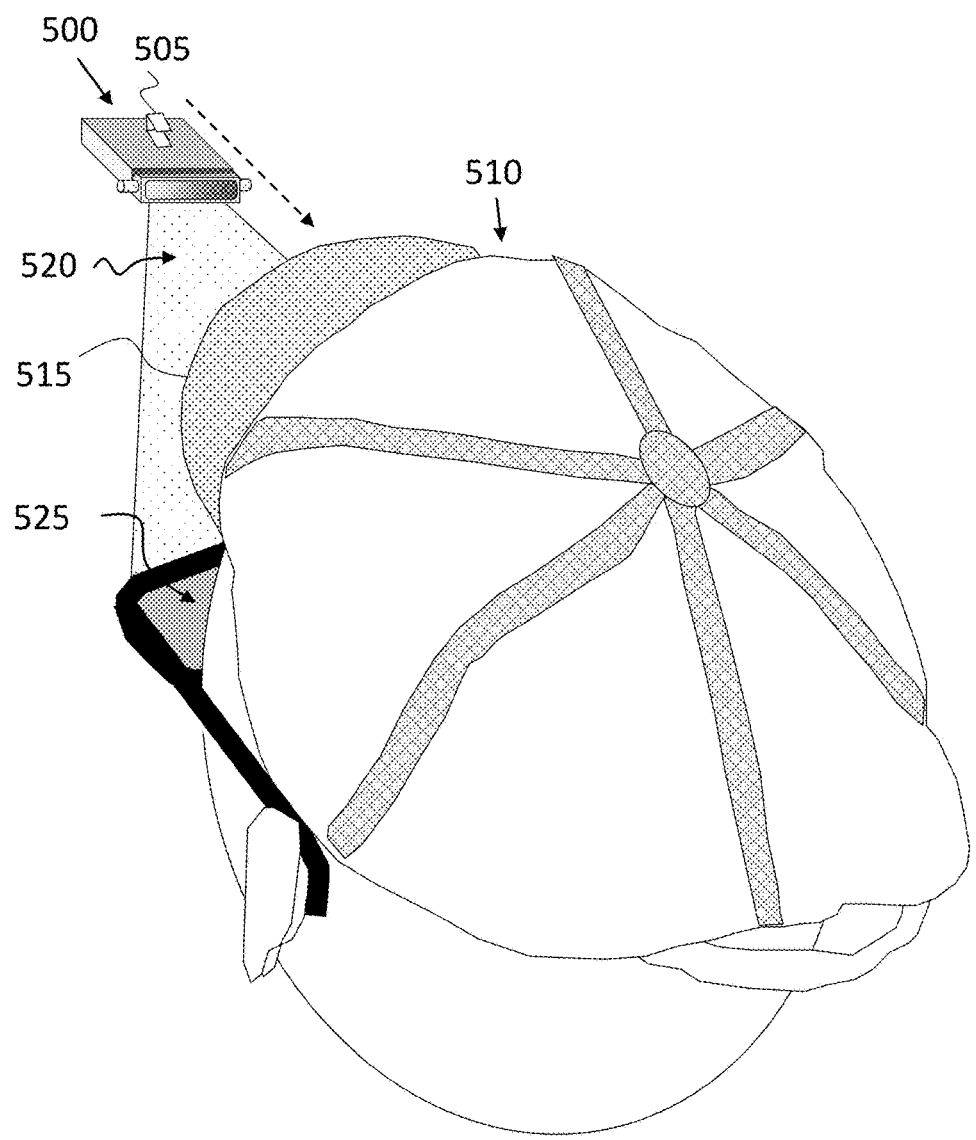
FIG. 5 depicts an exemplary DUVLS embodiment that illustrates attachment to a cap.
Figure 6A:
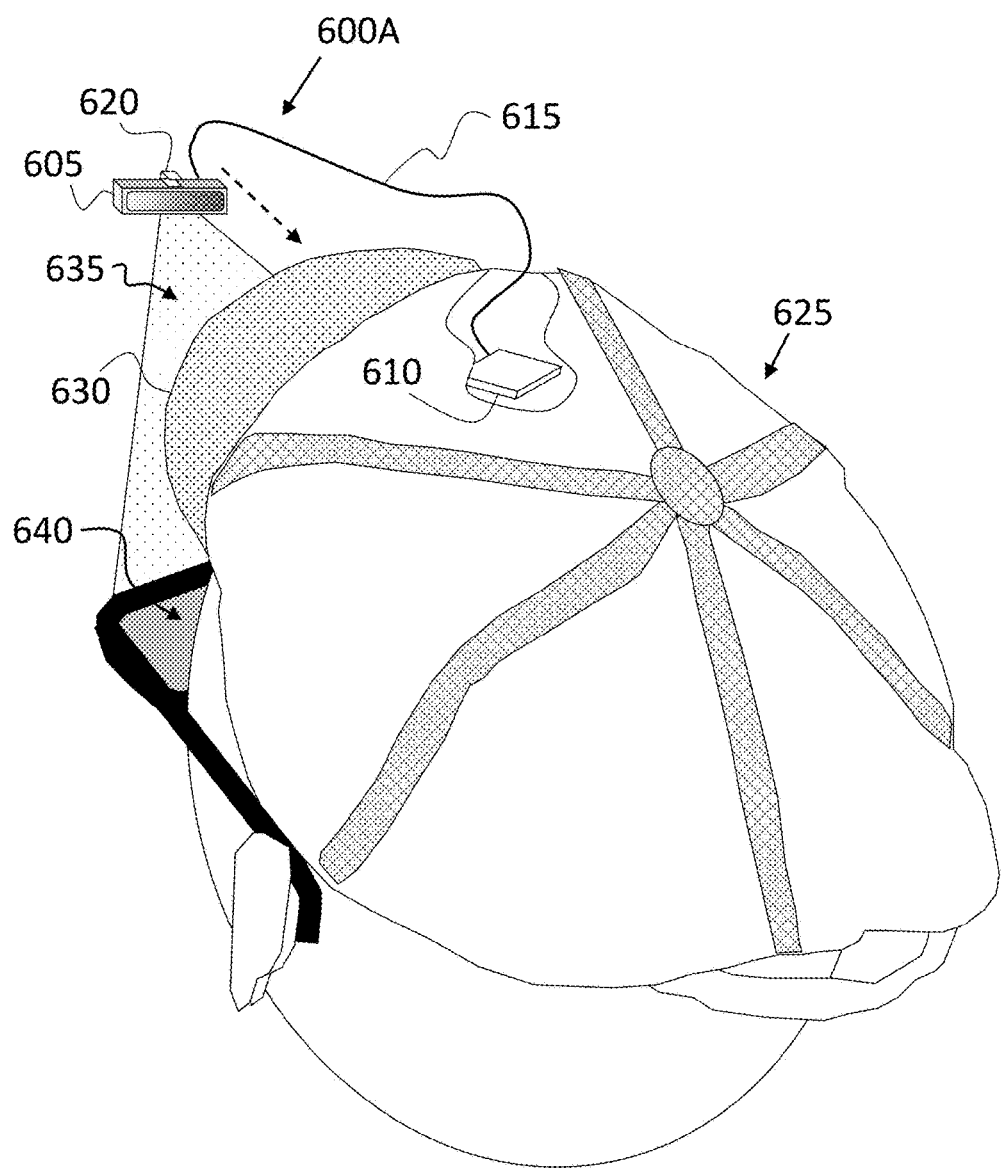
FIG. 6A depicts an exemplary DUVLS embodiment integrated into a cap.
Figure 6B:
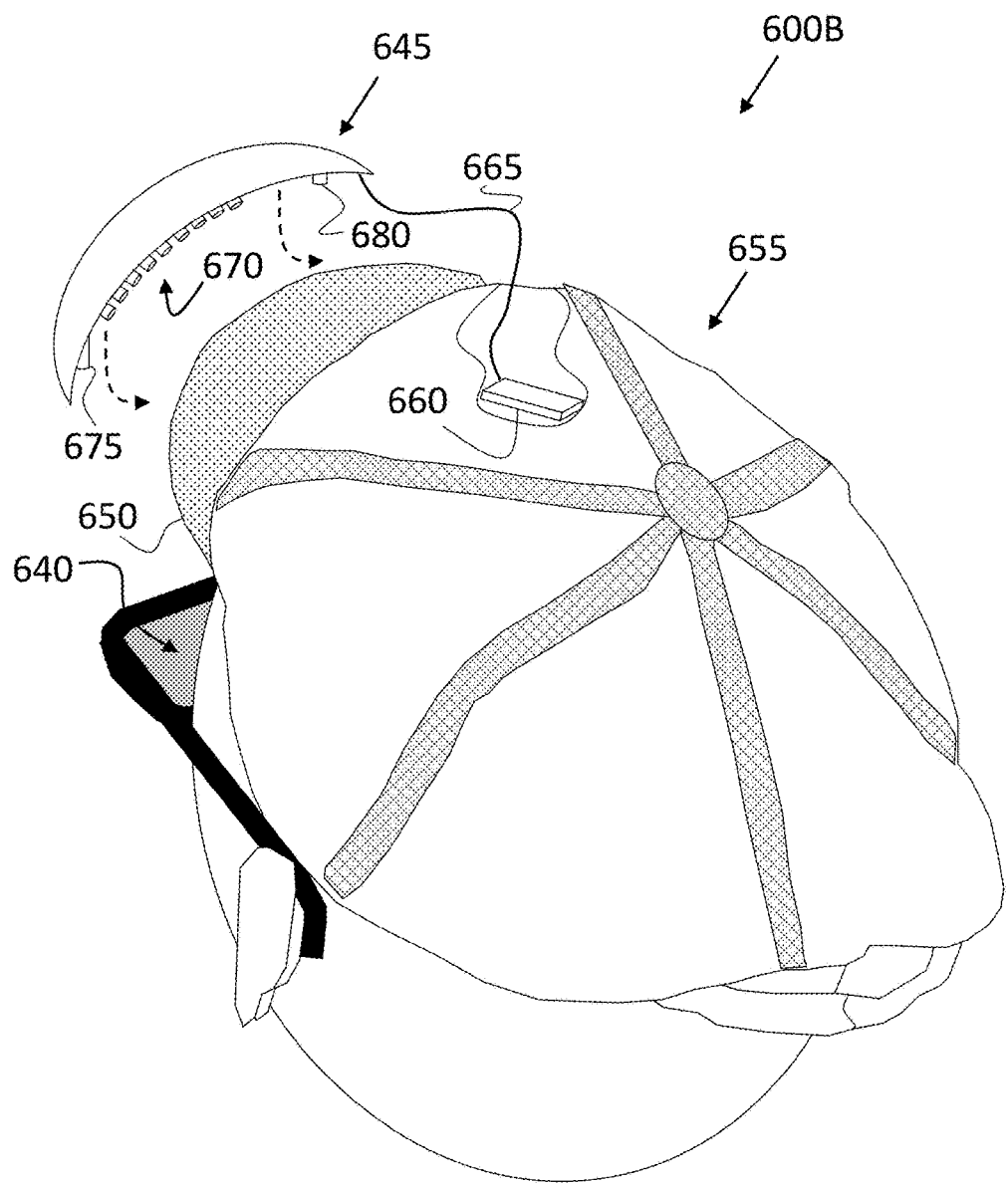
FIG. 6B depicts an exemplary DUVLS embodiment with manual controls integrated into a cap.
Figure 7:
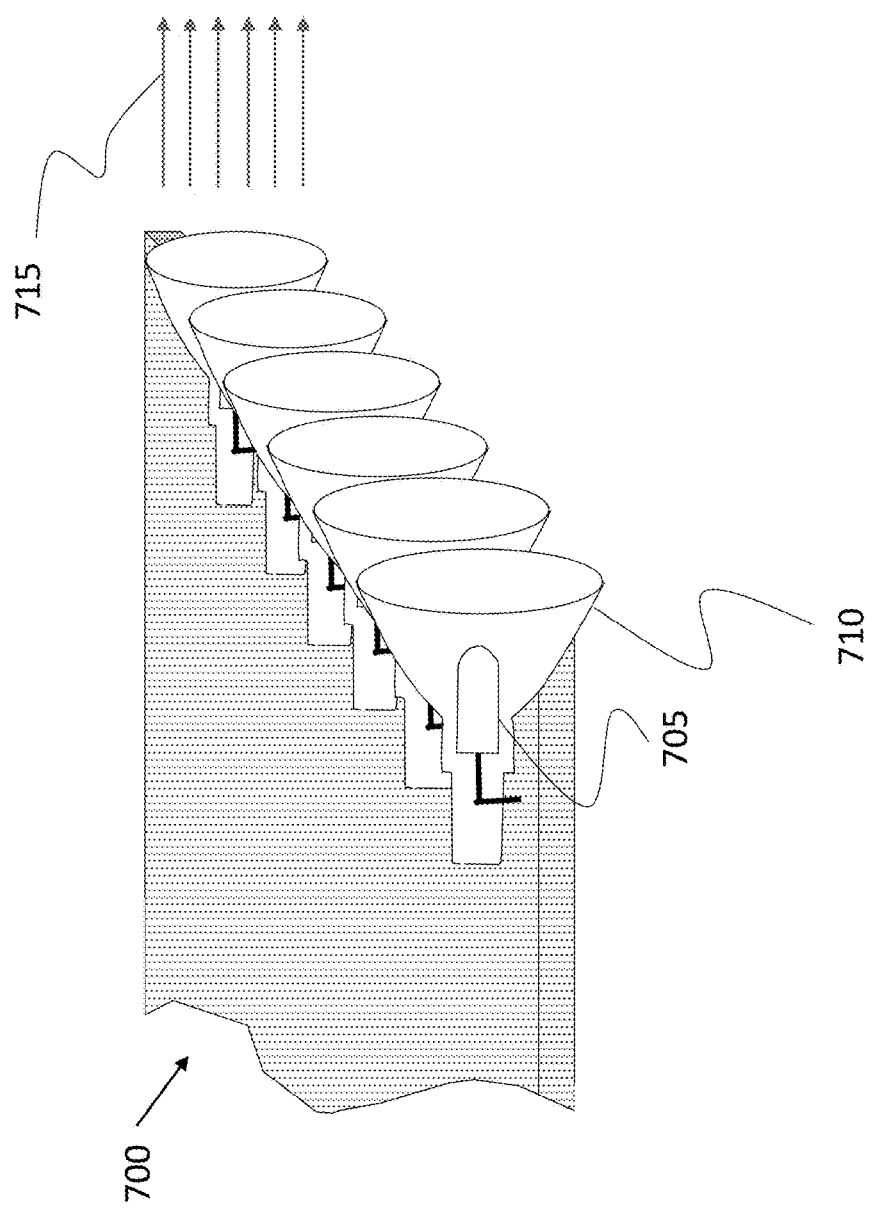
FIG. 7 depicts an exemplary reflector within a DUVLS that illustrates light directivity.
Figure 8:
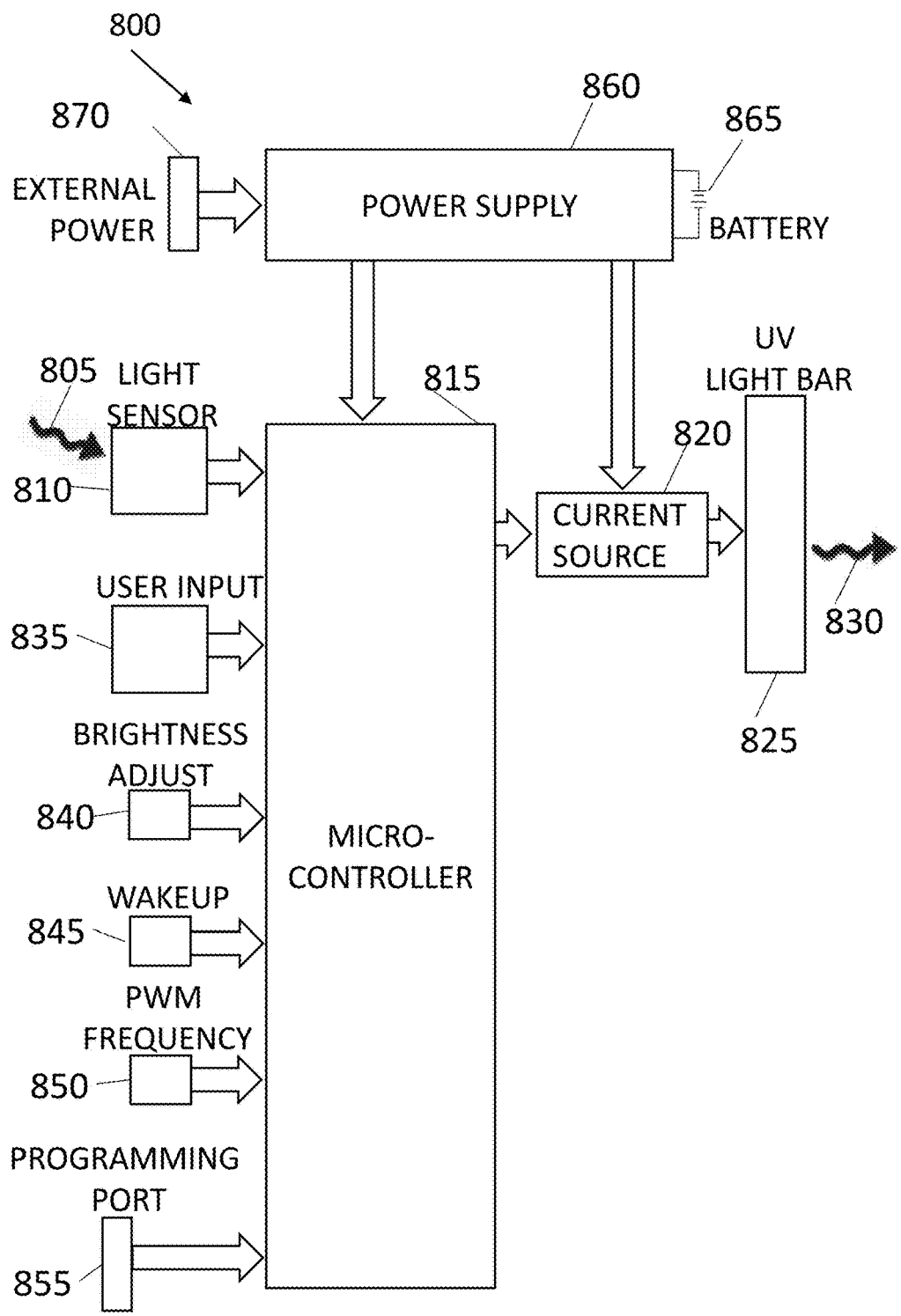
FIG. 8 depicts a functional block diagram of an exemplary DUVLS.

To aid understanding, this document is organized as follows. First, a sequence of drawings is briefly depicted in FIGS. 1A-1B. FIG. 1A specifically illustrates the basic functionality of spectacles with photochromic lenses, and FIG. 1B specifically illustrates an exemplary Dynamic UV Light System (DUVLS) embodiment generating ultraviolet (UV) light at an intensity controlled manually by a user or automatically in response to an ambient light level, in order to maintain a photochromic target lens in a darkened state. Second, with reference to FIG. 2, the discussion turns to an exemplary embodiment that illustrates a particular use case. Specifically, FIG. 2 depicts the incorporation of an exemplary embodiment within a sun visor as may be found in an enclosed automobile car, bus, train, airplane, helicopter, or boat for example. Next, with reference to FIGS. 3-5, exemplary embodiments are depicted in various mounting configurations. Specifically, FIG. 3 depicts an exemplary embodiment mounting to a sun visor. FIG. 4 depicts an exemplary embodiment mounting to an interior wall, above a window in a building. FIG. 5 depicts an exemplary embodiment mounting to a visor of a cap worn by a user, for example a baseball cap. FIGS. 6A and 6B depict incorporation of an exemplary embodiment within a cap. FIG. 7 depicts an exemplary reflector within an exemplary embodiment that illustrates light directivity, which may be used to focus the light energy toward the user's eyewear. FIG. 8 depicts a functional block diagram of an exemplary DUVLS.

FIG. 1A depicts a prospective view of the basic functionality of spectacles with photochromic lenses. FIG. 1A depicts the sun 105 radiating UV light rays 115 and visible light rays 120. The light rays fall upon exemplary spectacles with photochromic lenses 125. The exemplary spectacles with photochromic lenses 125 are shown in the darkened state due to exposure to the UV rays 115 from the sun 105. The UV light rays 115 and visible light rays 120 also fall upon a plate of UV absorbing material 110, for example, an automobile windshield or a glass window in a building. As depicted, the UV rays 115 are substantially attenuated as they pass through the UV absorbing material 110, whereas the visible light rays 120 are allowed to pass through the UV absorbing material 110. In response to the substantially filtered or attenuated intensity of UV rays 115 on the right side of the UV absorbing material 110, a pair of spectacles with photochromic lenses 130 are in the non-darkened state. Visible light rays 120 pass through the UV absorbing material 110 but do not cause effective darkening of the spectacles with photochromic lenses 130.

Figure 1B:
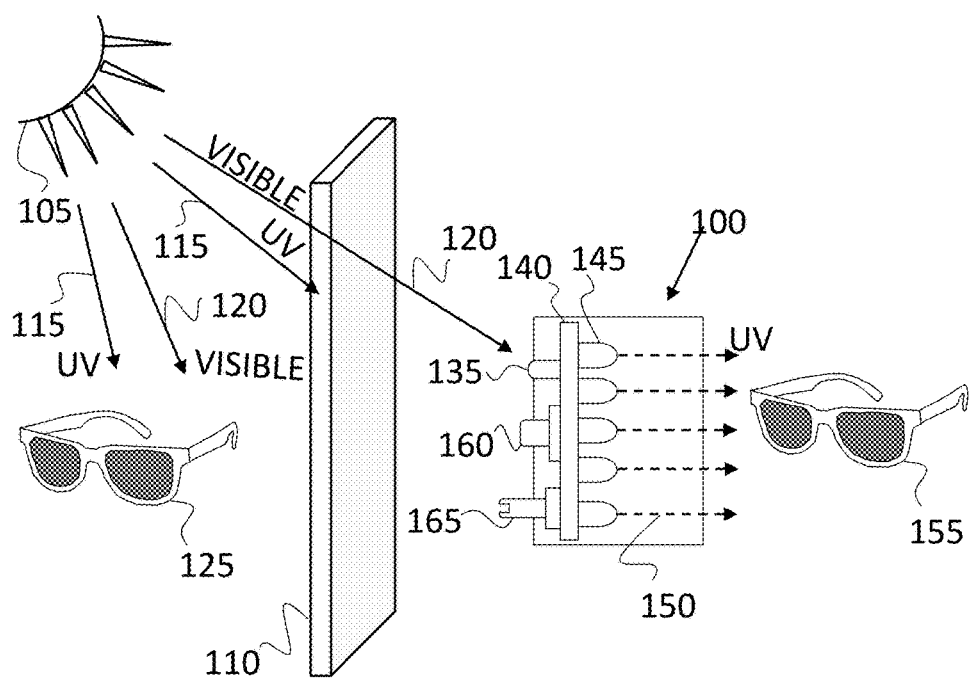
FIG. 1B depicts a prospective view of an exemplary Dynamic UV Light System (DUVLS) embodiment generating ultraviolet (UV) light.

FIG. 1B depicts a prospective view of an exemplary Dynamic UV Light System (DUVLS) embodiment generating ultraviolet (UV) light. In FIG. 1B an exemplary DUVLS 100 is added between the UV absorbing material 110, and a pair of spectacles with photochromic lenses 155. Visible light rays 120 fall on a light sensor 135 contained within the DUVLS 100. The light sensor 135 is contained on a control Printed Circuit Assembly (PCBA) 140. The light sensor 135 detects visible light rays 120 of the environment, and generates a resulting electrical signal. The control PCBA 140 processes the electrical signal and subsequently powers and controls one or more light sources 145. The light sources 145 emit UV light 150 at an intensity controlled in response to an ambient light level to advantageously darken the spectacles with photochromic lenses 155. The intensity control may take the form of pulse-width modulation (PWM) of the light sources 145.

In various embodiments, the light sources 145, for example, may emit ultraviolet (UV) light at a controlled intensity as a function of an intensity control signal generated by a controller. In various embodiments, the light sensor 135 may be remotely located, and may be installed to be directed toward the visible light source or may be directed in any other advantageous direction.

The control PCBA 140 includes a programmed on-button 160. The user may control the UV light source duration with the programmed on-button 160. The programmed on-button 160 may facilitate pre-programmed durations of UV on-time in response to a pre-programmed count detection of user actuations.

For example, in response to a user actuating the programmed on-button 160 one time, the on-time of the UV light source may be 10 minutes. In some examples, in response to a user actuating the programmed on-button 160 two times, the on-time of the UV light source may be 30 minutes. In some examples, in response to a user actuating the programmed on-button 160 three times, the on-time of the UV light source may be 60 minutes. These actuating-numbers and on-times are presented by way of example and not limitation.

The control PCBA 140 includes a manual adjustment knob 165. The user may control the UV light source intensity with the manual adjustment knob 165 to advantageously tailor the darkness of the spectacles with photochromic lenses 155 to suit user preference. Accordingly, in various examples, the control PCBA 140 may control the intensity of the light sources 145 with pulse-width modulation (PWM). For example, as the manual adjustment knob 165 is increased (e.g., clockwise), the duty cycle may be increased. As the manual adjustment knob 165 is decreased (e.g., counter-clockwise), the duty cycle may be decreased. The frequency of the PWM may be higher than the human eye detection rate. As such, the light sources 145 may appear to be always on (rather than flashing) which may advantageously reduce user distraction.

In various embodiments, the control PCBA 140 may be pre-programmed for a specific repeating time-period comprising on-time and off-time. For example, the on-time may be set ratiometrically with the manual adjustment knob 165 where fully clockwise produces an on-time for the entire time-period, and fully counter-clockwise produces an off-time for the entire time-period. Further, the manual adjustment knob set half-way produces light-source-on for the first half of the time-period and light-source-off for the second half of the time-period. In some examples, the percent on and percent off at the extremes of the manual adjustment knob 165 may not be 100% and 0%, but may represent a narrower range that is more suited for lens darkening. Such a narrowed range may advantageously give the user finer control, and may remove ineffective settings.

FIG. 2 depicts a prospective view of an exemplary DUVLS embodiment that illustrates integration within a sun visor. An exemplary DUVLS 200 is depicted inside a sun visor 205. FIG. 2 is shown with the lower left corner torn away to show the exemplary DUVLS 200. In the depicted figure, DUVLS 200 is supported by an electrified visor assembly that supplies power to operate the DUVLS 200. The exemplary DUVLS 200 is depicted powered by the automobile's existing electrical infrastructure, for example a lighted cosmetic mirror 210. The lighted cosmetic mirror 210 is shown connected with an exemplary power wiring harness 215 to provide a convenient method to power the DUVLS 200 from the automobile's battery. The DUVLS 200 is depicted with an exemplary user input feature 220 to control a light source 225 intensity or the DUVLS 200 on/off control for example. The sun visor 205 may require a light aperture to allow ambient light to reach a light sensor 230, and several light apertures to allow UV light 235 to reach the user from the light sources 225. The light sensor 230 detects the light intensity of the environment to advantageously adjust the light sources 225 at an intensity controlled in response to the ambient light level to advantageously darken spectacles with photochromic lenses.

In an illustrative example, a photochromic lens wearer (user), enters his attached garage from his house. The user's spectacles with photochromic lenses are initially clear since the user was previously indoors, sheltered from the sun. The user steps into his enclosed automobile, shuts the door and proceeds to drive. Once the user drives into the sunlight, the user deploys the sun visor into the downward state. The DUVLS, which may be assembled into the sun visor, may detect the visible light from the sun through the windshield, and may begin to emit UV light directed toward the user's spectacles with photochromic lenses. Although the automobile's windshield blocks the sun's UV light from entering the automobile's enclosed area, the DUVLS may provide UV light at an intensity and wavelength to darken the user's spectacles with photochromic lenses.

In various embodiments, the light sources 225 may emit ultraviolet (UV) light at a controlled intensity as a function of an intensity control signal generated by a controller.

FIG. 3 depicts a prospective view of an exemplary DUVLS embodiment that illustrates attachment to a sun visor and an exemplary tilting light bar feature. An exemplary DUVLS 300 is depicted, made up of a main housing 305 and a light bar 310. An angle adjust module 315 rigidly attaches to the main housing 305. The angle adjust module 315 rotatably attaches to the light bar 310. The main housing contains an attached exemplary clip 320. The exemplary clip 320 permits attachment of the DUVLS 300 to the sun visor 205, for example. The user is permitted to tilt the light bar 310 by use of a thumb knob 325, for example. The tilting action allows UV emitted light from the DUVLS 300 to be directed at the user at an intensity controlled in response to the ambient light level to advantageously darken spectacles with photochromic lenses.

In various embodiments, the tilting light bar 310, for example, may emit ultraviolet (UV) light at a controlled intensity as a function of an intensity control signal generated by a controller. In various embodiments, the light bar 310 may emit the UV light at an angle controllable by the user.

FIG. 4 depicts a prospective view of an exemplary DUVLS embodiment that illustrates attachment to a wall and an exemplary tilt feature. An exemplary DUVLS 400 is depicted containing an exemplary holder module 405. The exemplary holder module 405 permits attachment of the DUVLS 400 to a wall 410, for example. The exemplary holder module 405 is depicted with a tilting mechanism 415 rotatably attached to the DUVLS 400, wherein the DUVLS 400 is permitted to tilt. The tilting allows UV emitted light 420 from the DUVLS 400 to be directed at the user at an intensity controlled in response to the ambient light level to advantageously darken spectacles with photochromic lenses. In various embodiments, the UV emitted light 420 may emit at an angle controllable by the user.

As depicted in the exemplary embodiment of FIG. 4, the DUVLS 400 may be employed for indoor use and may be mounted to the wall 410. In some examples, mounting of the DUVLS 400 may be accomplished within the wall 410. Incorporation within the wall 410 may allow the DUVLS 400 to be flush with the outer surface of the wall 410. Various other methods of mounting the DUVLS 400 may be employed. Examples may include but not be limited to fixed attachment methods (e.g., screwing, nailing, gluing), or may include releasable attachment methods (e.g., hook and loop, hanging, perching, snapping).

FIG. 5 depicts an exemplary DUVLS embodiment that illustrates attachment to a cap. An exemplary DUVLS 500 is depicted containing an exemplary clip 505. The exemplary clip 505 permits attachment of the DUVLS 500 to a cap 510, for example, a cap visor 515. The DUVLS 500 then directs ultraviolet (UV) light 520 at an intensity controlled in response to the ambient light level to maintain a photochromic target lens 525 in a darkened state.

FIG. 6A depicts an exemplary DUVLS embodiment integrated into a cap. An exemplary DUVLS 600A has been advantageously broken into two parts; a remote light bar 605, and a control board with battery 610. The remote light bar 605 is electrically coupled to the control board with battery 610 via a control harness 615. The remote light bar 605 is depicted containing an exemplary clip 620. The exemplary clip 620 permits attachment of the remote light bar 605 to a cap 625, for example, a cap visor 630. The control board with battery 610 via and the control harness 615 are integrated into the cap 625. The remote light bar 605, connected to the control board with battery 610, directs ultraviolet (UV) light 635 at an intensity controlled in response to an ambient light level to advantageously maintain a photochromic lens 640 in a darkened state.

In some examples, the control harness 615 may be sewn into the cap 625 to keep the wiring protected from snagging or, for example, from hanging loose in the cap 625. In some embodiments, the control harness may be removably fastened to the cap, such as with a hook and loop style fastener system, for example.

In various embodiments, the remote light bar 605 may emit ultraviolet (UV) light at a controlled intensity as a function of an intensity control signal generated by the control board with battery 610.

FIG. 6B depicts an exemplary DUVLS embodiment with manual controls integrated into to a cap. An exemplary DUVLS 600B includes a control-display printed circuit board assembly (PCBA) 645. The control-display PCBA 645 is coupled to the underside of a cap visor 650. In the depicted figure, the cap visor 650 is an electrified visor assembly that supplies power to operate the DUVLS 600B. The cap visor is part of a cap 655. A power source 660 is electrically coupled to the control-display PCBA 645. The power source 660 is electrically coupled to the control-display PCBA 645 via a power harness 665. The control-display PCBA 645 includes an array of UV light sources 670 which are powered by the power source 660. The array of UV light sources 670 are directed toward the user's photochromic lenses 640.

The power source may be one or more batteries, for example, nickel-metal hydride (NiMH), which may advantageously provide high charge capacity. In some embodiments, the battery chemistry may be nickel-cadmium (Ni-Cad) which may advantageously provide a high number of charge cycles. Some examples may employ lithium-polymer (LiPo) which may provide light weight. Still other examples may employ lithium-ion (Li-Ion) which may advantageously be available in popular form factors. In some implementations, the power source may use lithium iron phosphate (LiFePO4) batteries, which may advantageously provide a very high number of charge cycles, and provide higher output voltage.

The power source may be compatible with common batteries sizes (e.g., A, AA, 9V) which the user may personally obtain. These sizes may use various battery chemistries such as alkaline, carbon, carbon-zinc, zinc-chloride and lithium. The power source may be re-chargeable. As such the power source may include a charging cord that plugs into a power source, (e.g., USB port). In some examples, the power source may include a power transformer and a detachable cord.

The control-display PCBA 645 includes an intensity adjustment knob 675. The user may control the UV light source intensity with the intensity adjustment knob 675 to advantageously tailor the darkness of the photochromic lenses 640 to suit their preference. Further, in various examples, the control-display PCBA 645 may control the intensity of the array of UV light sources 670 with pulse-width modulation (PWM). The frequency of the PWM may be higher than the human eye detection rate. As such, the array of UV light sources 670 may appear to be always on (rather than flashing) which may advantageously reduce user distraction.

The control-display PCBA 645 includes a programmed on-button 680. The user may control the UV light source duration with the programmed on-button 680. The programmed on-button 680 may provide pre-programmed durations of UV on-time in response to a pre-programmed count detection of user presses.

For example, in response to a user pressing the programmed on-button 680 one time, the on-time of the UV light source may be 10 minutes. In some examples, in response to a user pressing the programmed on-button 680 two times, the on-time of the UV light source may be 30 minutes. In some examples, in response to a user pressing the programmed on-button 680 three times, the on-time of the UV light source may be 60 minutes. These press-numbers and on-times are presented by way of example and not limitation.

In various examples, the power source may be one or more batteries included on the control-display PCBA 645. In some embodiments, the control-display PCBA 645 may be hidden within the cap material with the array of UV light sources 670 outwardly protruding. Hiding the control-display PCBA 645 within the cap material may advantageously provide for a more aesthetic look.

FIG. 7 depicts an exemplary reflector within a DUVLS that illustrates light directivity. A DUVLS light array 700 includes an active light source 705. The active light source 705 is coupled to a reflector 710. The reflector 710 may be used to direct the emitted light 715 from the active light sources 705 in a controlled columnated manner, at an intensity controlled in response to an ambient light level to advantageously maintain a photochromic target lens, in a darkened state. In various embodiments, the active light sources 705 may emit ultraviolet (UV) light at a controlled intensity as a function of an intensity control signal generated by a controller.

FIG. 8 depicts a functional block diagram of an exemplary DUVLS 800. Ambient light 805 falls upon a light sensor 810. The light sensor 810 circuit may be comprised of a photocell or a photo resistor followed by an analog amplifier and filter for example. The light sensor 810 sends an ambient light intensity signal to a microcontroller 815. The microcontroller 815 controls the output of a current source 820 in response to the ambient light 805 level. The current source 820 circuit may be comprised of an operational amplifier implemented current source controlled by a pulse width modulated signal (PWM) from the microcontroller 815 output port, for example. The current source 820 powers a UV light bar 825 produces a UV light 830. The UV light 830 intensity is a function of the current applied from the current source 820. The UV light bar may be implemented in an embodiment as such as is shown in FIG. 6 reference 605. The UV light bar may be implemented in a linear array as depicted in FIG. 7. The transfer function of input ambient light 805 to the output UV light 830 may be a mostly direct relationship. Stated another way, as the input ambient light increases, the need for darker photochromic target lenses increases, and therefore the need for higher generation of output UV light 830 intensity may increase. The UV light bar circuit may be made up of several parallel branches of several series-connected UV Light Emitting Diodes (LEDs). The microcontroller 815 also receives a user input signal from a user input component 835. The user input signal may be an analog signal from a potentiometer for example, used by the microcontroller 815 to manually adjust the UV light 830 intensity, for example. The microcontroller 815 also receives a brightness adjust signal from a brightness adjust component 840. The brightness adjust signal may be an analog signal from a potentiometer for example, to adjust the baseline UV light 830 intensity, or to adjust the level sensitivity of the ambient light 805, for example.

The microcontroller 815 also receives a wakeup signal from a wakeup component 845. An output signal from the wakeup component 845 may be a digital signal from a pushbutton for example, to reinitiate the DUVLS 800 functionality in the event of the DUVLS 800 turning off, due to an elapsed timeout, for example. The microcontroller 815 also receives a PWM frequency signal from a PWM frequency component 850. The output of the PWM frequency component 850 may be an analog signal from a potentiometer for example, to adjust the trade-off between user-perceived flicker and the response time of the UV light bar 825, for example. The microcontroller 815 may also receive programming commands and data from a programming port 855, when attached to a programming module, for example. The programming port 855 enables the DUVLS 800 to be initially programmed or to have its programming updated. The microcontroller 815 receives its power from a power supply 860. The power supply 860 receives power from a battery 865 and an external power input 870. The power supply 860 circuit may include switching components that connect the external power input 870 to the power supply 860 output, and in the absence of power from the external power input 870 connects the battery 865 power to the power supply 860 output, for example. The power supply 860 may contain charging circuitry such that the external power input 870 may be connected to a USB host port, to charge the battery 865, for example. The power supply 860 circuit may also include filters and regulators to condition the input power from the battery 865 and from the external power input 870, for example. The output of the power supply 860 supplies power to the microcontroller 815 and the current source 820. The microcontroller 815 controls the output of the current source 820 in response to the ambient light 805 level, which powers the UV light bar 825, which directs UV light 830 at a controlled intensity to maintain a photochromic target lens in a darkened state.

In various embodiments, the UV light bar 825, for example, may emit ultraviolet (UV) emitting ultraviolet (UV) light at a controlled intensity as a function of an intensity control signal generated by a controller, such as the microcontroller 815.

Although various embodiments have been described with reference to the figures, other embodiments are possible. For example, various DUVLS embodiments may incorporate power sources other than internal or external batteries. These examples may include solar power sources, kinetic energy harvesting, or rechargeable batteries or super-caps, such as are rechargeable via USB connection. Other exemplary embodiments may allow for remote location of the light sensor, either wired or wireless.

In some embodiments, the DUVLS may be supported by a visor. By way of example and not limitation, the DUVLS may be supported by integration into the visor, by hot-gluing, integrally molding, clipping, sticking, taping, screwing, pinning, riveting, gluing or sewing. In some implementations, the DUVLS may be removably attached. By way of example and not limitation, the removable attachment may be snaps, hook and loop, buttons, zippers, pins, tape, or magnets. In some examples, the DUVLS may be slid into a pocket within the visor. In various implementations, the DUVLS may be supported by the visor by use of an elastic band to removably attach the DUVLS to the visor. One or more attachment mechanisms may be used alone or in combination.

As a cost improvement example, a DUVLS light source may consist of cost effective, broad spectrum LEDs, wherein the DUVLS includes an optical filter with dye coating, to filter out the visible light spectrum, to emit only the desired UV light.

With reference to FIG. 8, suitable microcontrollers 815 for the execution of a program of instructions may include, by way of example and not limitation, both general and special purpose microcontrollers, which may include a single microcontroller or a subsystem consisting of a microprocessor and peripherals. The microprocessor and the peripherals may be supplemented by, or incorporated in, an ASIC (application-specific integrated circuit). In some embodiments, the processor and peripherals may be supplemented by, or incorporated in hardware programmable devices, such as a PIC (Programmable Interface Controller), fuzzy logic controller, or an FPGA (Field-Programmable Gate Array), for example.

In various implementations, the system component blocks shown in FIG. 8 may intercommunicate using suitable communication methods, equipment, and techniques. For example, the components of the system may exchange information by any form or medium of analog or digital data communication. Other implementations may transport messages by broadcasting, for example, by using radio frequency (RF) signals. With reference to the exemplary embodiment in FIG. 8, the light sensor 810 may be remotely located, communicating with the microcontroller 815 via a wired or a wireless link.

Still other implementations with reference to FIG. 8, are possible using appropriate interfaces to the microcontroller 815, such as, by way of example and not intended to be limiting, USB 3.0, Firewire, ATA/IDE, RS-232, RS-422, RS-485, 802.11 a/b/g, Wi-Fi, and Ethernet.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A dynamic ultraviolet light system (DUVLS) comprising:
    a control module configured to generate a light intensity control signal;
    a light source coupled to the control module such that the light source is configured to receive the light intensity control signal from the control module and emit ultraviolet (UV) light at a controlled intensity level as a function of the light intensity control signal, the light source comprising a plurality of ultraviolet light sources, wherein the plurality of ultraviolet light sources are arranged with their respective optical axes aligned substantially parallel to one another, and the plurality of ultraviolet light sources substantially lying in a common plane; and,
    a reflector assembly in optical communication with each of the plurality of ultraviolet light sources such that the UV light emitted by each of the plurality of ultraviolet light sources is directed substantially within a predetermined angle of the corresponding optical axis,
    wherein the light source is adapted to be supported by a visor, and,
    wherein the light intensity control signal comprises a modulated signal.

2. The system of claim 1, further comprising a light bar assembly that includes the light source.

3. The system of claim 2, further comprising an enclosure that contains the light bar assembly.

4. The system of claim 3, further comprising an angle adjust module coupled to the enclosure and supporting the light bar assembly in a rotatable relationship such that the light source emits the UV light at an angle controllable by a user.

5. The system of claim 1, further comprising a control input that determines characteristics of the light intensity control signal, the control input operatively coupled to the control module.

6. The system of claim 5, wherein the control input comprises a user adjustable input control operable to cause the control module to modulate the intensity control signal generated by the controller in response to user input.

7. The system of claim 5, wherein the control input comprises a light sensor arranged to detect an intensity of an ambient light in a region and to determine characteristics of the light intensity control signal as a function of the intensity of the ambient light in the region.

8. The system of claim 7, wherein the light sensor is adapted to detect the intensity of the ambient light in the region while the light sensor is disposed at a location remote from the light source.

9. The system of claim 1, further comprising an electrified visor assembly having two opposing parallel major surfaces connected peripherally by a minor edge surface, and supporting the controller and the light source, wherein the light source is disposed along the minor edge surface.

10. The system of claim 1, wherein the light intensity control signal comprises a pulse width modulated signal.

11. A dynamic ultraviolet light system (DUVLS) comprising:
    a control module configured to generate a light intensity control signal;
    a light source coupled to the control module such that the light source is configured to receive the light intensity control signal from the control module and emit ultraviolet (UV) light at a controlled intensity level as a function of the light intensity control signal, the light source comprising a plurality of ultraviolet light sources, wherein the plurality of ultraviolet light sources are arranged with their respective optical axes aligned substantially parallel to one another, and the plurality of ultraviolet light sources substantially lying in a common plane; and,
    a reflector assembly in optical communication with each of the plurality of ultraviolet light sources such that the UV light emitted by each of the plurality of ultraviolet light sources is directed substantially within a predetermined angle of the corresponding optical axis,
    wherein the light source is adapted to be supported by a visor.

12. The system of claim 11, further comprising a light bar assembly that includes the light source.

13. The system of claim 12, further comprising an angle adjust module coupled to the enclosure and supporting the light bar assembly in a rotatable relationship such that the light source emits the UV light at an angle controllable by a user.

14. The system of claim 11, further comprising a control input that determines characteristics of the light intensity control signal, the control input operatively coupled to the control module.

15. The system of claim 14, wherein the control input comprises a user adjustable input control operable to cause the control module to modulate the intensity control signal generated by the controller in response to user input.

16. The system of claim 14, wherein the control input comprises a light sensor arranged to detect an intensity of an ambient light in a region and determine characteristics of the light intensity control signal as a function of the intensity of the ambient light in the region.

17. The system of claim 16, wherein the light sensor is adapted to detect the intensity of the ambient light in the region while the light sensor is disposed at a location remote from the light source.

18. A dynamic ultraviolet light system (DUVLS) comprising:
   an enclosure;
   a control module disposed in the enclosure, the control module configured to generate a light intensity control signal;
   a light source coupled to the control module such that the light source is configured to receive the light intensity control signal from the control module and emit ultraviolet (UV) light at a controlled intensity level as a function of the light intensity control signal, the light source comprising a plurality of ultraviolet light sources;
   a control input that determines characteristics of the light intensity control signal, the control input operatively coupled to the control module; and,
   means for supporting the light source by a visor.

19. The system of claim 18, wherein the control input comprises a light sensor arranged to detect an intensity of an ambient light in a region and determine characteristics of the light intensity control signal as a function of the intensity of the ambient light in the region.

* * * * *